Dec. 10, 1968 L. W. COULSON ETAL 3,415,437

STRIPPER MEMBER FOR PINCH ROLLERS

Filed Sept. 20, 1965

INVENTORS
LEONARD W. COULSON
HARRY L. THIES
BY Joseph A. Genovesi
ATTORNEY

United States Patent Office 3,415,437

Patented Dec. 10, 1968

3,415,437

STRIPPER MEMBER FOR PINCH ROLLERS

Leonard W. Coulson, Slinger, and Harry L. Thies, Oconomowoc, Wis., assignors to La Belle Industries, Inc., Oconomowoc, Wis., a corporation of Wisconsin Filed Sept. 20, 1965, Ser. No. 488,528
3 Claims. (Cl. 226—187)

ABSTRACT OF THE DISCLOSURE

This disclosure relates to a stripper member extending into a circumferential recess around the periphery of the pressure roller of a magnetic tape transport system. The stripper extends into the recess on the discharge side of the pressure roller so as to be positioned to remove any tape tending to adhere to the roller. The pressure roller is mounted for movement toward and away from the capstan, or drive roller, of the transport system and preferably the stripper is connected for joint movement with the pressure roller relative to the drive roller, and correspondingly the tape.

This invention relates to magnetic tape transport systems.

Conventionally, tape advance in a magnetic tape recorder, or playback device, is provided by the cooperation between a drive roller and a pressure roller. In operation the tape has a tendency to adhere to and follow the pressure roller rather than separate from the pressure roller. This results in the tape looping back on the pressure roller rather than passing directly, in a desired manner, from the pressure roller and drive roller to the following stage in system. This condition is further aggravated under high humidity conditions and is more prevalent where the recorder, or playback device, is periodically left inactive with the tape held against the pressure roller. Various solutions have been proposed to this problem, however, they have not been entirely satisfactory as most have required involved mechanisms which complicate the construction of the transport system and increase the cost thereof. For example, a typical proposed solution consisted of providing an operating mechanism which separates the pressure roller and drive roller whenever the tape recorder is inactive to thereby relieve the pressure of the tape against the pressure roller and reduce the tendency for the tape to adhere to the pressure roller.

This invention is concerned with this problem of insuring proper tacking of the tape as it leaves the pressure and drive rollers and has as a general object to insure adequate separation and passage of the tape from the transport system drive members.

To achieve this and other objects this invention proposes to provide a mechanism on the discharge side of one of the tape transport system rollers, specifically the pressure roller, which will engage the roller and separate the tape from and prevent its looping back on the roller.

Other objects and advantages will be pointed out in, or be apparent from, the specification and claims, as will obvious modifications of the embodiment shown in the drawings, in which:

Figures 1, 3:
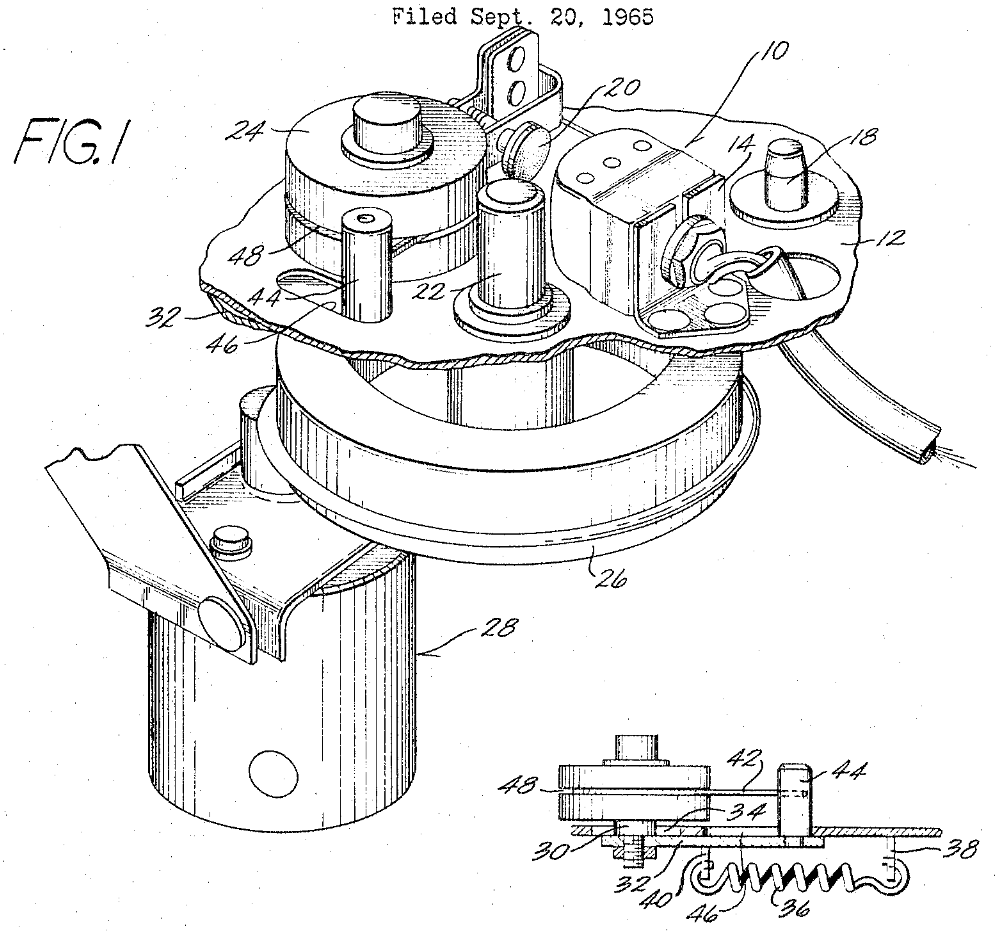
FIG. 1 is a perspective of a portion of a tape transport system embodying this invention.
FIG. 3 is a section view taken generally along line 3—3 of FIG. 2.
Figure 2:
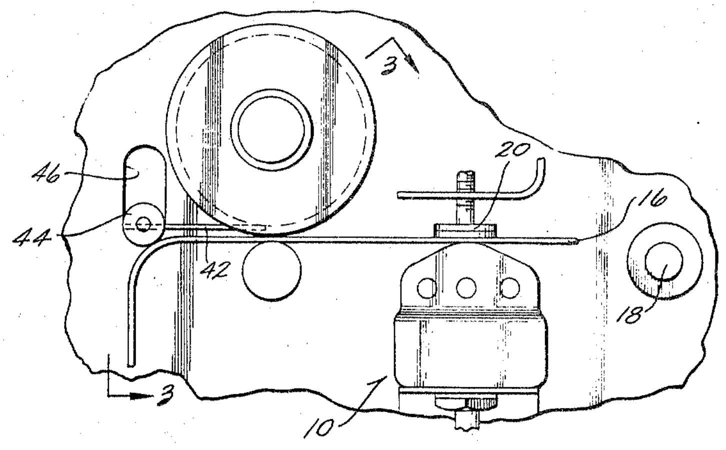
FIG. 2 is a plan view of the tape transport system of FIG. 1.

It will be appreciated that this invention is not limited to any specific type of tape system and for convenience is illustrated in an arrangement adapted for use with a cartridge-type tape system. With particular reference to the drawing, magnetic tape head 10 is connected to a support platform 12 by a bracket 14. Since the cartridge construction forms no part of this invention and is not necessary to an understanding thereof it has not been illustrated and only a portion of the tape 16 is shown threaded past the tape head and drive elements. A number of cartridge support pins 18 are provided on platform 12 to receive the cartridge and provide a connection between it and the platform.

Tape 16 passes over magnetic tape head 10 and a spring-biased pressure pad 20 is supported on platform 12 and associated with the magnetic head to maintain engagement of the tape with the head for proper playback. The construction and function of both the magnetic head and pressure pad are conventional. Tape 16 is advanced past the magnetic head by a drive system including drive roller, or capstan, 22 and pressure roller 24. Drive roller 22 is supported for rotation with respect to platform 12 and is connected to a flywhel 26 which is in turn driven by a motor assembly 28, the flywheel being provided to insure a relatively uniform speed of the tape past the magnetic tape head. Pressure roller 24 is supported on a shaft 30 which extends through platform 12 and is fixed to a plate 32 suitably mounted for sliding movement with respect to platform 12. Slot 34 is provided in support platform 12 to permit movement of the pressure roller with respect to drive roller 22. To insure adequate driving engagement between tape 16 and drive roller 22 pressure roller 24 is biased into engagement with the drive roller by tension spring 36, the tension spring being connected between support platform 12 and plate 32 by tabs 38 and 40 formed on the plate and support platform, respectively. With this arrangement the pressure roller is biased into engagement with the drive roller with a desired, predetermined pressure to insure adequate traction between the tape, drive roller and pressure roller for proper travel of the tape through the playback system. From the drive and pressure roller tape 16 returns to the cartridge tape reel (not shown) which is driven in a suitable, conventional manner (not shown).

To provide a tape system which requires a minimum of attention it is desirable that the tape be maintained in a relatively taut condition and that the formation of loops in the tape between various transfer points be avoided. One point in the tape transport system which is particularly susceptible to this unwanted condition is at the pressure and drive rollers. In operation, the tape has displayed a tendency to adhere to the surface of the pressure roller, this condition has been more prevalent where the system has been operated in a high humidity environment and/or where operation of the system is intermittent, i.e., the tape is periodically at rest during which time the tape at the point of engagement between the pressure roller and drive roller is under pressure and can adhere to the pressure roller. When this condition exists the tape, rather than passing directly along its return path, forms a loop on the discharge side of the pressure and drive rollers folding back on the pressure roller. Since the condition resulting in the loop formation is a continuing one, the loop will become progressively larger eventually requiring attention to return the tape to a taut condition to prevent fouling of the tape transport system or damage to the tape.

This invention provides a relatively simplified and yet effective manner of counteracting the tendency for the tape to adhere to the pressure roller by insuring separation of the tape from the pressure roller and thereby maintaining the tape in a taut condition along its return path. More particularly, a stripper member 42 is positioned on the discharge side of pressure roller 24. The stripper member is connected to an upright post 44 which is in turn connected to sliding plate 32 and extends through a slot 46 in support platform 12. Post 44 is connected for movement with sliding plate 32 so that the stripper member and its support post move jointly with the pressure roller with respect to drive roller 22, slot 46 accommodating this movement of post 44. Stripper member 42 extends toward pressure roller 24 and is operatively associated with the periphery thereof to separate tape 16 from the pressure roller in the event that the tape becomes adhered thereto. Specifically, the pressure roller includes a circumferentially extending outwardly opening recess 48 which is generally U-shaped through an axial section. Stripper member 42 is in the form of an elongated pin which extends into recess 48 so that the pin intersects the revolving periphery, or working surface, of the pressure roller and will strip tape adhered to the periphery from the roller for direct return in the transport system.

The stripper pin arrangement provides an effective and simple manner of insuring separation of the tape from the pressure roller to prevent the formation of undesirable loops and maintain the tape in a taut condition. The taut condition of the tape is maintained and the problem of pressure between the pressure roller and drive roller causing the tape to adhere to the pressure roller is counteracted, both without the necessity for any complicated or costly mechanisms for relieving the pressure between the two rollers when the system is at rest.

Although but one embodiment of the present invention has been illustrated and described, it will be apparent to those skilled in the art that various changes and modifications may be made therein without departing from the spirit of the invention or from the scope of the appended claims.

We claim:

1. In a tape transport system the combination of:
a drive roller,
a pressure roller operatively adjacent said drive roller and cooperating therewith to provide a tape advance,
a stripper member,
means supporting said stripper member on the tape discharge side of said pressure and drive rollers in operative engagement with said pressure roller to separate tape from said pressure roller on the tape discharge side thereof and prevent said tape from looping back on said pressure roller,
and means supporting said pressure roller and said stripper member for joint movement relative to said drive roller.

2. In a tape transport system the combination of:
a drive roller,
a pressure roller operatively adjacent said drive roller and including a working surface cooperating with said drive roller to provide a tape advance,
means defining a recess in said working surface,
a stripper member,
means supporting said stripper member on the discharge side of said pressure roller and projecting into said recess so that said stripper member and said working surface overlap and said stripper member is positioned to separate tape from said pressure roller to prevent said tape from looping back on said pressure roller,
means supporting said pressure roller, said stripper member and said stripper member support means for joint movement relative to said roller,
and means biasing said pressure roller, and correspondingly said stripper member and said stripper member support means, toward said drive roller.

3. The tape transport system of claim 2:
wherein said system is a magnetic tape transport system.
and including a magnetic head upstream of said drive and pressure rollers arranged to engage a magnetic tape being drawn through said drive and pressure rollers.

References Cited

UNITED STATES PATENTS

| | | | |
|---|---|---|---|
| 125,766 | 4/1872 | Stowe | 226—187 |
| 2,348,355 | 5/1944 | Miller | 226—186 |
| 3,042,281 | 7/1962 | Balvin | 226—181 |

M. HENSON WOOD, Jr., *Primary Examiner.*

R. A. SCHACHER, *Assistant Examiner.*

U.S. Cl. X.R.

226—196